Jan. 12, 1932.  J. W. MYERS  1,841,048
PROCESS AND APPARATUS FOR PREPARING NEGATIVES FOR PRINTING
Filed April 19, 1928  3 Sheets-Sheet 1
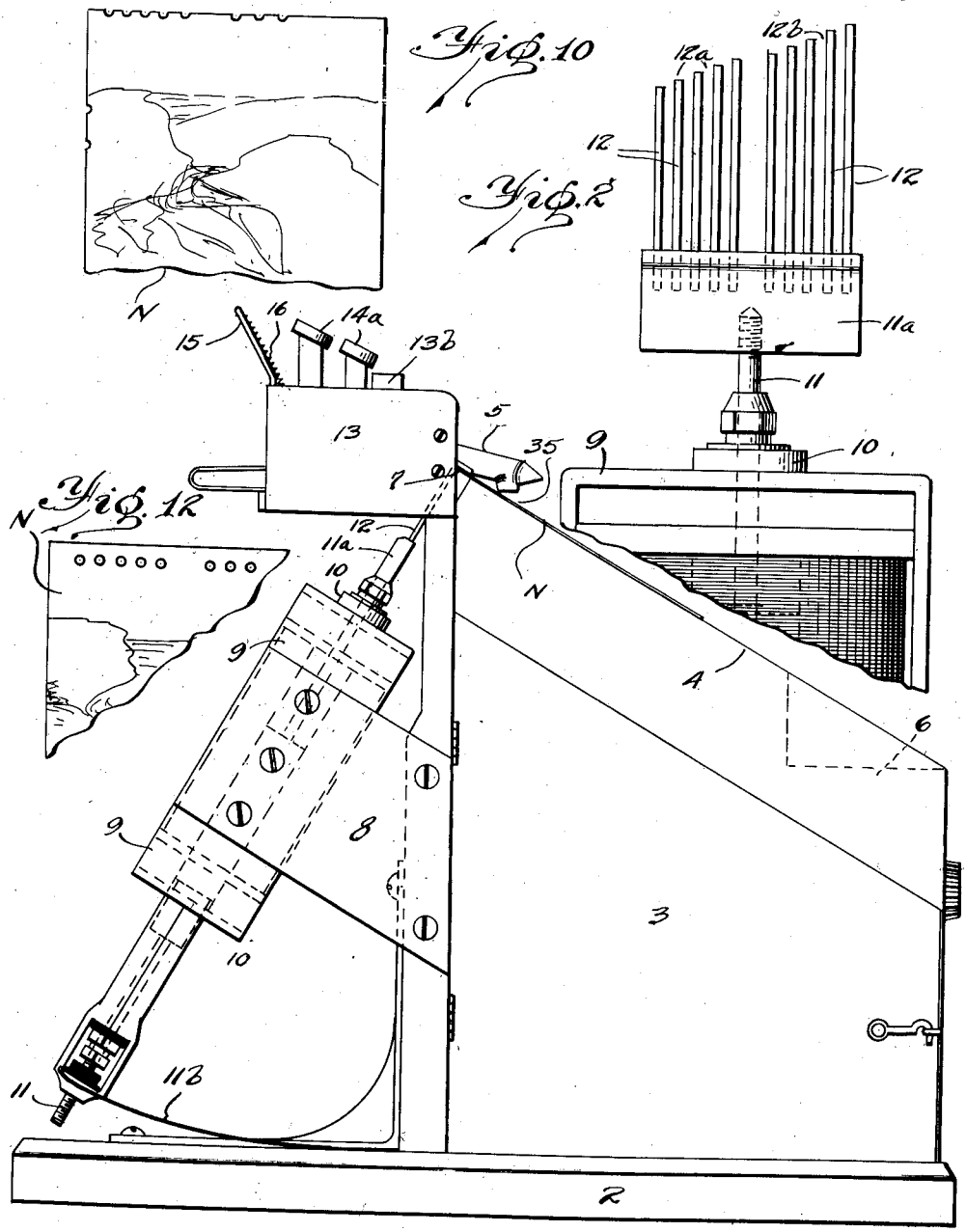
INVENTOR.
Joseph W. Myers
BY Elliott Stoddard
ATTORNEY

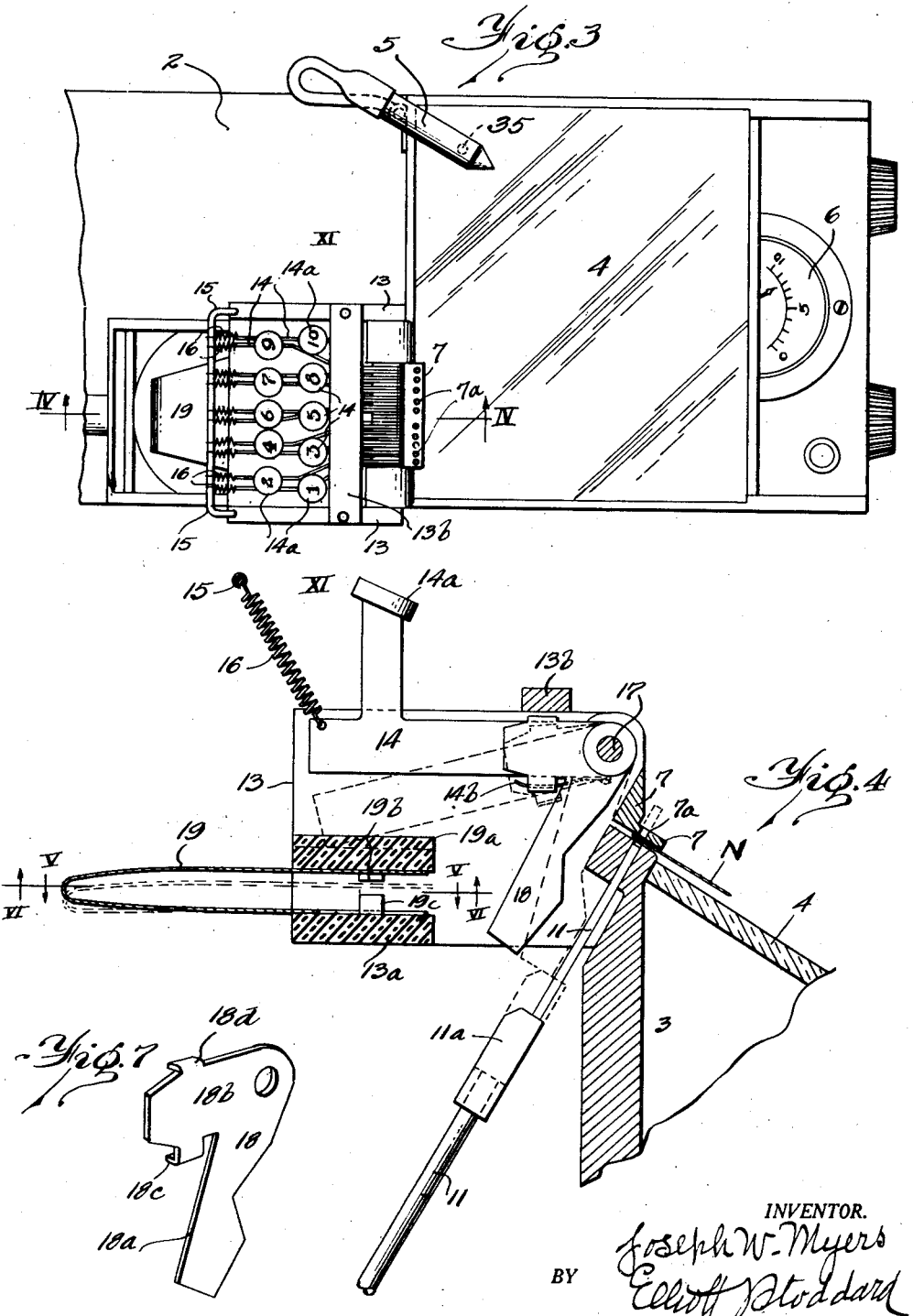

Jan. 12, 1932.   J. W. MYERS   1,841,048
PROCESS AND APPARATUS FOR PREPARING NEGATIVES FOR PRINTING
Filed April 19, 1928   3 Sheets-Sheet 3
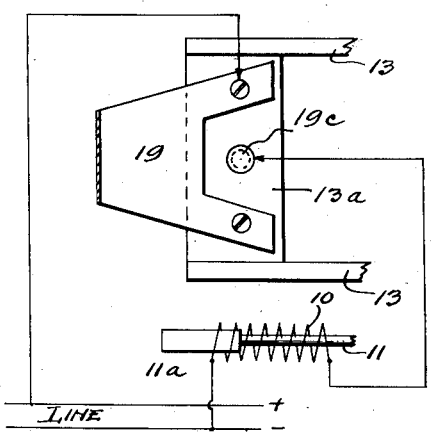
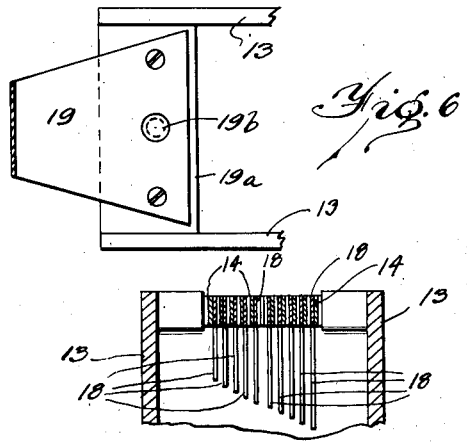
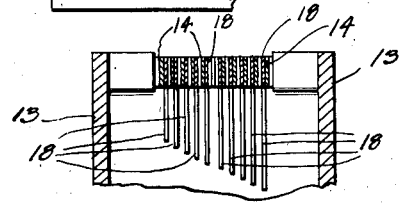
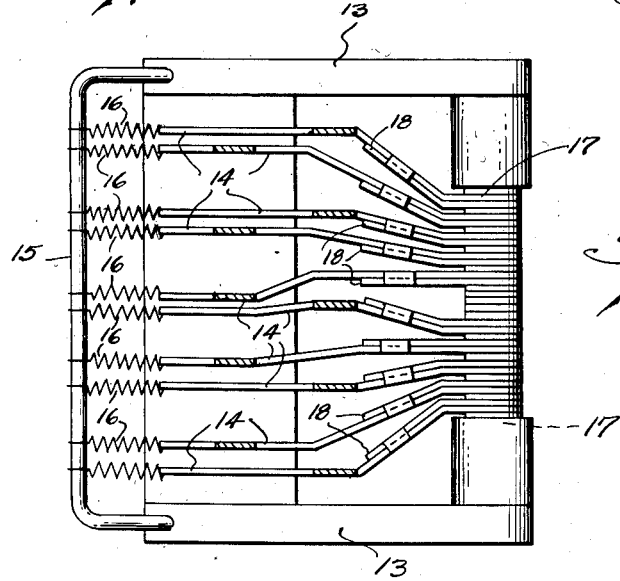
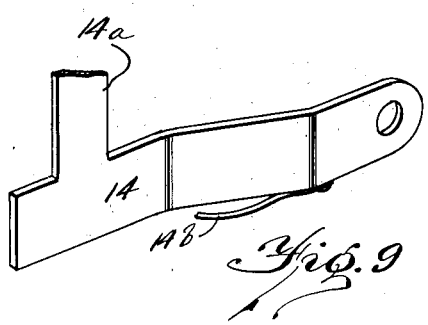
INVENTOR.
Joseph W. Myers
BY Elliott Stoddard
ATTORNEY.

Patented Jan. 12, 1932

1,841,048

UNITED STATES PATENT OFFICE

JOSEPH W. MYERS, OF JACKSON, MICHIGAN

PROCESS AND APPARATUS FOR PREPARING NEGATIVES FOR PRINTING

Application filed April 19, 1928. Serial No. 271,137.

My invention relates to a process and apparatus for preparing negatives for printing and an object of my improvements is to adapt a negative to be printed by unskilled operatives and uniform and excellent results obtained.

I have shown in the accompanying drawings an apparatus in which my invention is embodied and by which the process is performed, in connection with an apparatus for ascertaining the printing time and quality of paper to be used, which apparatus is shown more in detail in my co-pending application, Serial Number 241,031, filed December 19, 1927.

Figure 1 is a side elevation of the apparatus of my previous application, above named, with an apparatus embodying my invention attached thereto.

Figure 2 is a detail elevation of the plunger and guiding frame therefor, looking from the left of Figure 1.

Figure 3 is a plan view of the apparatus of Figure 1.

Figure 4 is a detail section on the line IV—IV, Figure 3, to an enlarged scale.

Figure 5 is a detail section on the line V—V, Figure 4, in connection with a diagrammatic showing of the operative circuits, looking in the direction of the arrows.

Figure 6 is a detail section on the line VI—VI, Figure 4, looking in the direction of the arrows.

Figure 7 is a perspective view of the gaging lever.

Figure 8 is a detail plan view of the apparatus shown in Figure 4, some of the parts being removed to more clearly show those parts that are beneath.

Figure 9 is a perspective view of an operating lever, the finger key being broken away.

Figure 10 is a plan view showing a part of a negative marked by the apparatus shown and in accordance with my invention.

Figure 11 is a detail view in elevation and section on the line XI—XI, Figure 3.

Figure 12 shows an alternative marking of the negative.

For the purpose of this application it will be sufficient to briefly describe the apparatus of my previous application as follows:—

2 is a base, and 3 is a rectangular enclosure on said base having a slanting translucent top 4. 5 indicates the light-sensitive cell or portion of a circuit in which circuit is included a galvanometer 6. 35 (Fig. 1) indicates a light ray which is thrown from the interior of the enclosure 3 through the translucent top 4 at the upper right hand corner thereof, to impinge upon the light sensitive portion of said circuit to modify the current passing through the galvanometer. The galvanometer needle swings over a special scale, a distance proportional to the current passing through said circuit.

The lightest part of the image on the negative that is within the interest of the picture is placed upon the translucent surface 4 so that the ray 35 will pass through it and the indication of the galvanometer measuring the current then passing-through the circuit measures the translucency of this part. The darkest part of the image of the negative may also be placed upon the surface 4 so that the ray 35 will pass through it and the reading of the galvanometer will then indicate the translucency of this part.

7 is a jig for receiving the edge of the negative and having vertical apertures 7a therein for coacting with punches, hereinafter described.

8 is a supporting bracket secured to the side of the upright 26 and extending rearwardly therefrom. 9 is a frame supported by the brackets 8 and extending at a slight angle to the vertical, as shown in Figure 1.

10 is a solenoid supported by the frame 9. 11 is a plunger, either constituting or connected with the core of the solenoid 10. 11a is a supporting head secured to the upper end of the plunger 11 and carrying two series 12a, 12b of five punches, each, at its upper edge, said punches extending in lines parallel to the plunger 11 and in position to enter the aperture 7a of the jig 7. As shown, most distinctly in Figure 2, the punches 12 are uniformly varrying in lengths from one end to the other of the series.

13, 13 are frame plates secured to the upright 26 at its upper end and extending rearwardly therefrom. 13a and 13b are cross pieces joining the plates 13, Figure 4.

14 indicates the actuating keys provided with finger keys 14a and pivoted at their inner ends around the arbor-shaft 17, extending between the plates 13 at their inner upper corners. 15 is a wire-yoke extending between the plates 13, above the lever 14. 16 indicate tension springs of which there is one to each lever 14 acting to restore and hold said lever to the upper limit of its travel in which position the lever is horizontal. The upper ends of said springs are secured to the yoke 15.

18 are gaging levers, one of which is pivoted around the shaft 17 next and close to each of the levers 14. Each of the levers 18 has a horizontal arm 18b, from which extend laterally two lugs 18c and 18d, one above and the other below its adjacent lever 14. Each of the levers 18 has also a downwardly extending arm 18a adapted, when oscillated to its inner position over the head 11a to limit the upward movement of said head. 14b is a spring carried at the lower edge of each of the levers 14 and engaging against a lug 18c at the lower edge of the arm 18b of the adjacent gaging lever 18. The downwardly extending arms 18a of the levers 18 are of different lengths, for the purpose of limiting the upward movement of the head 11a to different positions, for the purpose hereinafter described.

19 is a U-shaped flat spring secured at one end to the cross piece 13a extending rearwardly therefrom and returning to a point just above the end secured to the cross piece. 19b and 19c are contacts normally held apart by the elasticity of the spring, but adapted to engage when the upper leg of the spring is pressed downward to complete the circuit through the solenoid 10.

The operation of the above described apparatus is as follows:—

If the lever 14 has the numeral 1 upon its finger-key 14a and is pressed downward it will first turn its adjacent key 18, by means of the spring 14b engaging the lug 18c, until the lower end of the arm 18a comes over the head 11a. The lever 14 is pressed further flexing the spring 14b coming into contact with the upper leg of the spring 19 and forcing the contact 19b into engagement with the contact 19c, completing the circuit through the solenoid coil and drawing the plunger upward until the head 11a strikes against the end of the arm 18a, at which time the longest of the punches 12 has passed through the jig 7, the other punches being below said jig.

In this same way if any other actuating key is pressed down it will limit, by the length of the arm 18a of its gage lever 18, the distance the head 11a rises so that the number of punches have passed through the jig 7 that is indicated by the number on its particular finger-key. The finger keys 14a are numbered consecutively from 1 to 10, to correspond to the numbers on the scale of the galvanometer indicating the current, and thereby the translucency of the negatives at the point being examined.

A negative is taken and laid upon the surface 4 through which light is shining from the interior of the enclosure 3, and the light spot of said negative within the interest of the picture observed and moved into the path of the ray 35. The galvanometer 6 is then observed and the key 14a having a number corresponding to that indicated by the needle on the scale is pressed down, after the edges of the negative has been placed with its edge in the jig 7.

When the circuit is completed through the solenoid, as above described, the head 11a is thrown upward forcing the number of punches 12 through the jig 7, corresponding to the number on the key and consequently cutting that number of notches in the edge of the negative, as shown in Figure 10.

I have prepared a chart containing the time data for each degree of translucency of the light spot and each degree of illumination, and the operator having the negative marked as above has only to refer to this chart to know the correct time to expose the negative in printing.

The reading of the darkest point of the image may be taken and the reading for the lightest part subtracted from the reading for the darkest point to give the degree of contrast, and numbers corresponding to this difference may be marked upon another edge of the negative and by reference to a chart prepared for this purpose the proper sensitive paper may be selected.

A chart for selecting the paper and the times of exposure will be furnished each user who will be able to get the best results uniformly and certainly with an unskilled operator that he has heretofore been able to only approximate by employing a highly skilled operator of long experience.

It will be observed that the notches are so formed that their bounding edges are regular curves and not sharp corners so that the negative is not apt to tear and it will be also noted that the punch marks are formed in small groups so that the operator may quickly note their number without counting them.

An alternative method is to punch the holes through so that they are completely formed and in the margin of the negative, as shown in Figure 12.

The indication of the keys are consecutive numbers and represent relative qualities or degrees of quality, so that one number has a definite relation to the one preceding and following, thus if different intensities of light are employed all the quantities indicated will be affected in a definite ratio so that corrections or alterations to correspond to changes in illumination are easily made.

What I claim is:

1. A system for marking film negatives to indicate the proper degree of exposure required to print which consists in progressively perforating the edge of the negative, each perforation indicating an exposure time.

2. A system for marking film negatives to indicate the proper degree of exposure required to print which consists in progressively perforating the edge of the negative, each perforation indicating an exposure time, the total number of perforations of the series indicating the exposure factor of the negative.

3. A system for marking film negatives to indicate the proper grade of printing paper to use which consists in progressively perforating the edge of the negative, each perforation indicating a relative change in the contrast of the negative, the sum of said perforations indicating the total contrast of the negative and a paper with the necessary latitude being indicated.

In testimony whereof, I sign this specification.

JOSEPH W. MYERS.